July 15, 1958 R. L. CARLSTEDT 2,842,984
DRILLING MACHINES
Filed Feb. 15, 1954 2 Sheets-Sheet 1

Inventor
Ragnar Leonard Carlstedt
By James C. Master
His Attorney

July 15, 1958 R. L. CARLSTEDT 2,842,984
DRILLING MACHINES

Filed Feb. 15, 1954 2 Sheets-Sheet 2

United States Patent Office 2,842,984
Patented July 15, 1958

2,842,984

DRILLING MACHINES

Ragnar Leonard Carlstedt, Hagersten, Sweden, assignor to DHB Corp., New York, N. Y., a corporation of New York Application February 15, 1954, Serial No. 410,353

Claims priority, application Sweden February 18, 1953

6 Claims. (Cl. 77—5)

This invention relates to drilling machines of the type operating with a high cooling medium pressure and adapted for the drilling of longitudinally extending holes in the work-piece retained by a machine spindle or shaft.

In machines of said type, the liquid cooling medium such as oil, which may be subjected to a pressure of the order of magnitude of 25 atmospheres or more, is caused to enter into the bore on the outer face of a hollow shank carrying a drill head having a larger diameter than that of the shank, whereupon the large quantities of drillings or chips which are a consequence of the drilling operation, are flushed out by the oil through the interior of the shank. When the drill head emerges from the completed bore, the oil under the high pressure has free escape and may be sprayed over the machine. On the other hand, it is extremely difficult to reduce the oil pressure in the very exact moment and to a requisite degree without at the same time neglecting the requirement of efficient cooling at the high cutting speeds applied.

One main object of the invention is to provide a drilling machine having means adapted in a simple and reliable way to eliminate said difficulty.

According to the present invention, the apparatus to be disclosed includes a coil spring adapted to urge a cup-shaped open-end member secured upon the machine spindle or shaft, against the work-piece, thereby establishing a seal against that end of the work-piece from which the drill head emerges upon conclusition of the drilling operation. The cup-shaped member thus resiliently urged against one end of the work-piece not only seals that end, but facilitates the loosening and separation of the work-piece from the holder when the drilling operation is completed. Moreover, by the arrangement described, the work-piece is, during the drilling operation, axially loaded by drill pressure, oil pressure in the drilling end and by the urge exerted by the spring-pressed cup-shaped member against the end of the work-piece. This pressure-loading of the work-piece aids in the drilling operation until the drill head reaches the point of emergence through one end of the work-piece.

In certain instances, the axial loading of the work-piece due to the pressures referred to above is extremely high, and in the case of very slender workpieces the loading may be objectionably high. With this in mind, a still further object of this invention is the provision of an arrangement whereby the total axial loading on a work-piece can be reduced without sacrificing the efficiency of the seal at the spindle end of the workpiece.

Further objects and advantages of the invention will become apparent from the following description, considered in connection with the accompanying drawings, which form part of this specification, and of which:

Figure 1:
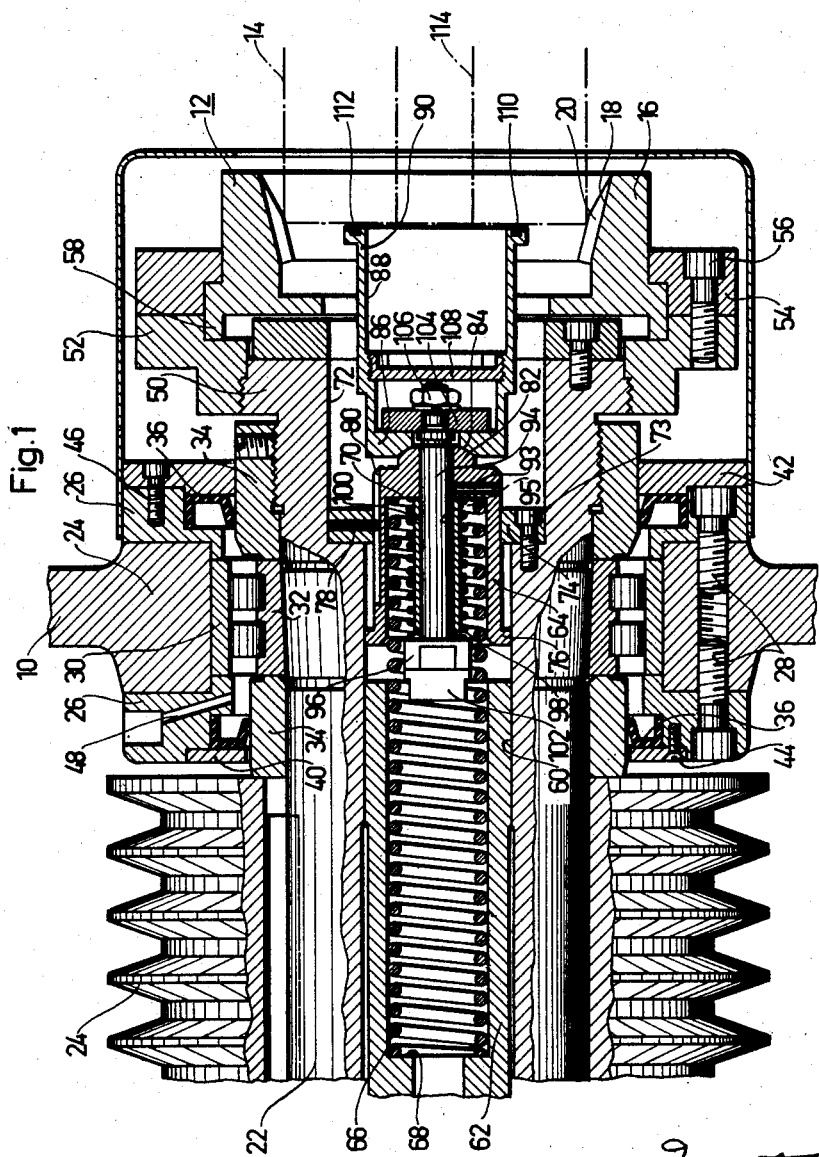
Fig. 1 is an axially sectional view of the end part of a drilling machine embodying the invention.

Referring to the drawings, in the figures of which identical parts are denoted by the same reference numerals, 10 designates a machine housing carrying a holder member, generally denoted by 12, for a work-piece 14, a portion of which is shown in dotted lines. For purpose of retaining the work-piece, said holder member is formed as a sleeve member 16 provided with an outwardly conical recess 18 formed with grooves 20 extending substantially in the direction of the generatrix. The sleeve member 16 is secured on a shaft 22, which latter is positively coupled to a transmission disc 24a of a type suited for the purpose under consideration. The shaft 22 has a bearing disposed in an annular flange 24 provided in the machine housing 10, said flange having two annular members 26 abutting on either side thereof, said annular members in turn being secured to the flange by means of screws 28. In the embodiments illustrated said bearing is a roller bearing, the outer ring 30 of which is retained in the flange while being axially fixed by means of said annular members 26, and the inner ring 32 of which is likewise fixed on the shaft 22 in an axial direction by means of annular members 34 disposed on either side of said ring. The end faces of the bearing are sealed outwardly for instance by means of annular sealing members 36 having a U-shaped sectional profile and inserted into annular grooves in the members 26 and retained in these grooves by means of annular discs 40, 42 secured in said members by means of screws 44 and 46, respectively. Lubricant is supplied to the bearing 30, 32 through a channel 48.

The shaft 22 is formed on a portion located outside the annular member 34 and the disc 40 with an outwardly projecting flange 50 provided with external threads to receive inner threads of an annular member 52 adapted by means of screws 56 to secure a flange 58 of the member 16 holding the work-piece 14 between the annular member 52 and a further annular member 54 located outside the annular member 52.

The shaft 22 has a bore 60 encasing two sleeve members 62, 64 disposed behind one another and enclosing a helical spring 66 adapted by pressing against bearing surfaces 68, 70 of the respective members 62 and 64 to press the sleeve member 64 located adjacent the shaft end in a direction towards said shaft end with a force which may amount to 300 kilograms. To limit the movement of the latter member 64, an annular member 74 retained by means of screws 73 is disposed in a widened portion 72 of the shaft bore 60, said widened portion being open towards the end of the shaft. In the inner bore of the annular member 74, the inner diameter of which is smaller than that of the shaft bore, the sleeve member 64 is slidable with a portion projecting close to the inner end of the sleeve member 64, on which an annular flange 76 is formed, which flange 76 constitutes a stop shoulder against the annular member 74. To rotate the sleeve member 64 in company with the shaft 22, the member 74 is provided with a radially extending pin 78 extending into and slidable in a groove 80 provided and longitudinally extending in the outer surface of the sleeve member 64.

The end of the sleeve member 64 adapted to project into the widened portion 72 of the shaft bore has the shape of a journal 82, the outer face of which is of a partly spherical configuration to bear on a recess 84 formed in a corresponding way in the rear wall 86 of a hollow, cup-shaped member 90 having a cylindrical bore 88. At the center of the partly spherical recess 84 said member 90 has an aperture 92 through which a rod 94 freely passes, said rod extending into the sleeve member 64 and also, likewise with play, into the helical spring 66, where the rod terminates in a stop 96 for a helical spring 98 surrounding said rod. A sleeve 100 is further provided between the rod 94 and the spring 98. The stop 96 is kept in position by means of a nut 102, The opposite end of the rod 94 extends, in addition to its passage through the aperture 92, through a disc 104 bearing against the inner bottom surface of the member 90. Beyond said disc 104 the rod 94 carries a nut 106 keeping the disc pressed against said bottom or wall 86 and forcing the partly spherical surfaces of the journal 82 to bear against the surfaces 84 under the pressure from the spring 98. As the aperture 92 has a greater diameter than the rod 94 and the latter has a spring-actuated axial mobility, and due to the configuration of said surfaces abutting at 84, the member 90 is permitted to perform a limited automatically retrogressive oscillatory motion. On rotation of the sleeve member 64 the rod 94 is entrained by a pin 93 projecting into a longitudinally extending groove 95 provided in the outer surface of the rod. To seal the interior of the cylindrical bore 88 from the opening 92 in the bottom wall thereof, a sealing disc 108 is screwed into the bore.

In the embodiment illustrated in Fig. 1, the member 90 is provided on its cylindrical front edge with an annular groove 110 adapted to receive a packing ring 112 for sealing contact by abutment against the end face of the work-piece 14. By the device just described the cooling medium such as the cooling oil which upon completed drilling of the bore indicated by the dash-dotted lines 114 will rush out through said bore, is caused to return through the opening. In this way a completely closed circuit for the cooling medium is formed.

The spring 66 is capable of exerting sufficient axial force to remove the workpiece from the sleeve 16 after the drilling operation is completed. The spring 66 as appears from the preceding description is also strong enough to overcome the pressure of the cooling medium when the latter rushes into the interior of the chamber 88 so that an adequate sealing is insured between the workpiece and the packing ring 112.

Figure 2:
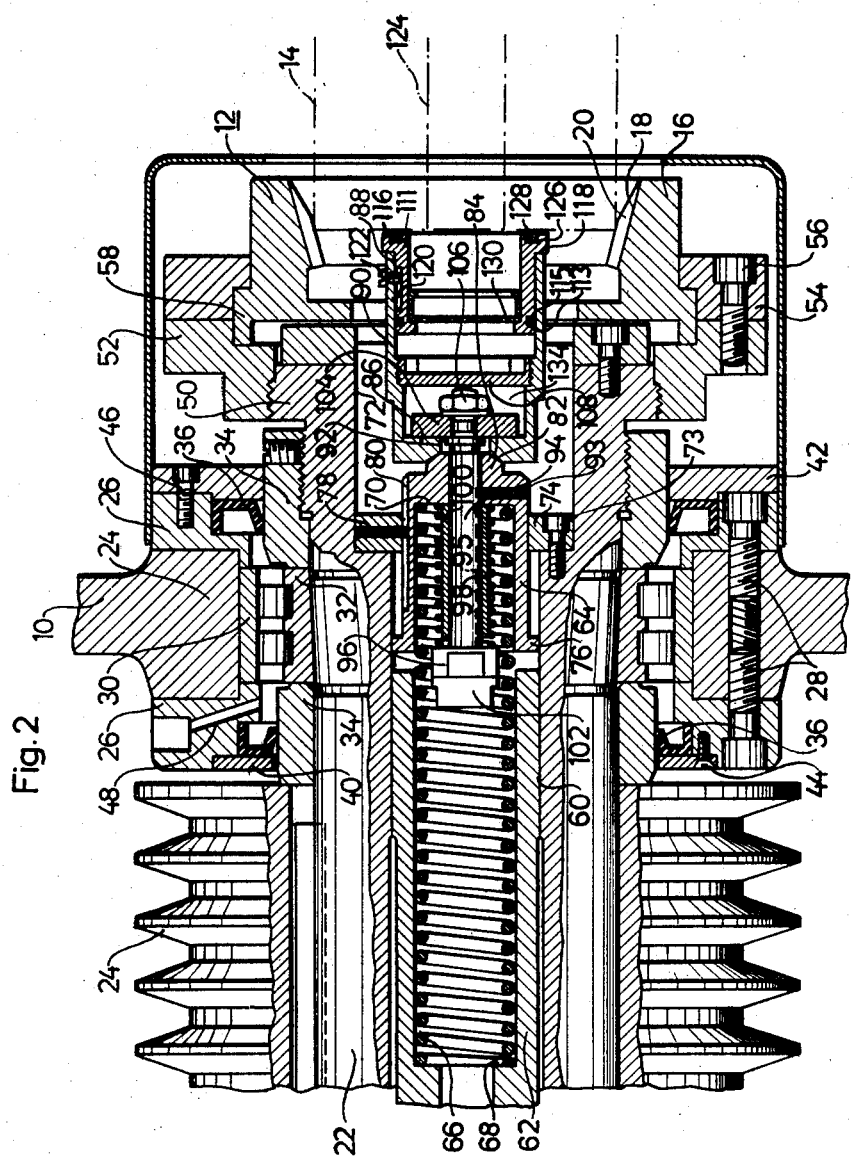
Fig. 2 is a similar axially sectional view of a modified end part of a drilling machine embodying the invention.

Referring to Fig. 2 illustrating an improved embodiment of the invention, a further sleeve 111 is slidably fitted into the bore 88, said sleeve having at its inner end an annular groove 113, into which is inserted a packing ring 115 to tighten against the wall of the bore. In order to limit the sliding movement of the sleeve 111 in an inward direction within the bore, said sleeve has at its outer end an outwardly projecting annular flange 116 bearing in its final inner position against the outer edge 118 of the member 90. For guidance of the sleeve 111 and for limiting of its outward movement, an axial groove 120 formed in the outer surface of the sleeve is entered by the free end of a guide pin shaped as a screw 122 secured onto and projecting from the member 90. The sleeve flange 118 which, in addition to its purpose of acting as a stop, is adapted to be pressed with a sealing fit against the end face of the work-piece 14 around the bore indicated by chain-dotted lines 124, and is provided in its end edge with an annular groove 126 receiving a packing ring 128. Finally, a filter plate 130 is fixed by pressure within the sleeve 111 and delimits a space 134 outside the disc 108.

When the cooling medium enters the chamber 88 it will exert an axial pressure on the sleeve 111 in both directions. At the inner end of the sleeve 111 the oil pressure acts on the entire annular end surface thereof. Due to the fact that the packing ring 128 has a somewhat less diameter than the chamber 88 the oil pressure acts at the opposite outer end of the sleeve 111 on a less area and with the result that the axial oil pressure acting on the sleeve 111 at its inner end in a direction towards the workpiece will be the greater so that the resultant oil pressure will press the sleeve 111 towards the workpiece 14.

While several more or less specific embodiments of the invention have been described above, it is to be understood that this is for the purpose of illustration only, and that the invention is not to be limited thereby, but its scope is to be determined by the appended claims.

What I claim is:

1. A drilling machine of the character described comprising, a rotated spindle, a cup-shaped member carried at one end of the spindle and having a limited axial movement relatively to the spindle, a seat for the end of a workpiece through which a drill emerges upon completion of a drilling operation, the cup-shaped member being held against said end of the workpiece, spring means for urging said member against the workpiece, a slidable sleeve located within the cup-shaped member and having a restricted slidable movement relatively to the same, and means at one end of the sleeve for establishing a sealing fit between said end and the end of the work-piece disposed against the seat.

2. A drilling machine of the nature described comprising; a rotary spindle, a cup-shaped member mounted in the end of the spindle that engages the workpiece and having limited freedom of axial movement relative to the spindle but being connected with the spindle so as to rotate therewith, the open end of the cup facing the workpiece that engages the spindle, sealing means carried by the open end of the cup for sealingly engaging the end of the workpiece whereby upon drilling of the workpiece from the end opposite the spindle the hole through the spindle will be sealed by the cup-shaped member when the drill emerges from the workpiece, there being spring means in the spindle urging the cup-shaped member against the end of the workpiece with a thrust greater than the force developed within the cup-shaped member by cooling fluid from the hole drilled in the workpiece when the drill emerges therefrom tending to force the cup-shaped member away from the workpiece, and said cup-shaped member being supported in the spindle for limited freedom of angular movement therein relative to the axis of the spindle whereby the cup-shaped member will conform to the end of the workpiece which it engages thus to insure sealing engagement therewith.

3. An arrangement as set forth in claim 2 in which the said freedom of angular movement of the sup-shaped member is provided by a member having a rounded nose against which the back of the cup-shaped member bears, and which said member having the rounded nose is engaged by the spring means on the side opposite the cup-shaped member.

4. In a drilling machine of the nature described comprising; a rotary spindle adapted for engaging an end of a workpiece to be bored longitudinally, a cup-shaped member mounted in the spindle having its open end facing the workpiece and being spring-urged toward the workpiece, said cup-shaped member having a resilient annular sealing element mounted on its open end for sealing engagement with the workpiece, said cup-shaped member being free to move axially a limited amount in said spindle, and there being a sleeve member reciprocably mounted in said spindle and keyed thereto, and which sleeve member has a rounded nose on one side engaging the back end of the cup-shaped member and being engaged by the biasing spring for the cup-shaped member on its one side whereby the cup-shaped member has a predetermined freedom of angular movement relative to the axis of the spindle so as to conform to the shape of the workpiece which it is to engage.

5. A drilling machine of the nature described comprising; a rotatable spindle adapted for engaging an end of a workpiece to be bored longitudinally, a cup-shaped member in the spindle having its open end facing the end of the workpiece in the spindle, said cup-shaped member having an annular sealing ring mounted on its open end to engage the end of the workpiece in sealing relation, a sleeve slidably keyed in the spindle on the axis thereof and having a closed end abutting the back end of the cup-shaped member, said cup-shaped member and said sleeve being shaped so as to form inter-engaging spherical surfaces so that the cup-shaped member is tiltable angularly relative to the axis of the spindle, a first spring urging the cup-shaped member against the end of the sleeve member, and a second spring urging the sleeve member in the spindle toward the cup-shaped member whereby the cup-shaped member is frictionally held in position on the sleeve member while the sleeve member and cup-shaped member together are thrust toward the workpiece.

6. An arrangement as set forth in claim 5 in which there is a sealing member mounted in the cup-shaped member between its open workpiece end and the other end thereof whereby a bolt can be provided running through the bottom walls of said sleeve member and cup-shaped member whereby the first mentioned spring can be positioned between the end of the bolt and the bottom of said sleeve member.

References Cited in the file of this patent
UNITED STATES PATENTS

| | | |
|---|---|---|
| 283,367 | Barclay | Aug. 21, 1883 |
| 800,894 | Baldwin | Oct. 3, 1905 |
| 1,041,028 | Church | Oct. 15, 1912 |
| 1,316,236 | Hoffman | Sept. 16, 1919 |
| 1,503,836 | Kunzer | Aug. 5, 1924 |
| 1,979,478 | Leland | Nov. 6, 1934 |
| 2,552,463 | Searles | May 8, 1951 |